(12) United States Patent
Sundararajan et al.

(10) Patent No.: US 11,924,046 B1
(45) Date of Patent: Mar. 5, 2024

(54) NETWORK HIERARCHY CONSTRUCTS ENABLING INSTANT GLOBAL WIDE AREA NETWORK CONNECTIVITY

(71) Applicant: Cisco Technology, Inc., San Jose, CA (US)

(72) Inventors: Balaji Sundararajan, Fremont, CA (US); Bhairav Dutia, Santa Clara, CA (US); Ankur Bhargava, Pleasanton, CA (US); Satish Mahadevan, San Ramon, CA (US); Srinivas Yalamanchanli, Fremont, CA (US); Ziad Sarieddine, San Jose, CA (US); Nikolai Pitaev, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/075,276

(22) Filed: Dec. 5, 2022

Related U.S. Application Data

(60) Provisional application No. 63/400,119, filed on Aug. 23, 2022.

(51) Int. Cl.
*H04L 41/12* (2022.01)
*H04L 41/0894* (2022.01)
*H04L 67/52* (2022.01)

(52) U.S. Cl.
CPC .......... *H04L 41/12* (2013.01); *H04L 41/0894* (2022.05); *H04L 67/52* (2022.05)

(58) Field of Classification Search
CPC ...... H04L 41/12; H04L 41/0894; H04L 67/52
See application file for complete search history.

(56) References Cited

U.S. PATENT DOCUMENTS 7,380,025 B1 * 5/2008 Riggins ............... H04L 41/0853
710/10
7,929,535 B2 * 4/2011 Chen ..................... H04W 4/029
709/217

(Continued)

FOREIGN PATENT DOCUMENTS

EP 1947804 A1 7/2008

OTHER PUBLICATIONS

Ye et al., "Accuracy, Scalability, Coverage—A Practical Configuration Verifier on a Global WAN", in the Proceedings of the Annual conference of the ACM Special Interest Group on Data Communication on the applications, technologies, architectures, and protocols for computer communication, Jul. 2020, pp. 599-614.

(Continued)

*Primary Examiner* — Sm A Rahman
(74) *Attorney, Agent, or Firm* — Lee & Hayes P.C.

(57) ABSTRACT

This disclosure describes techniques and mechanisms for disclosure describes techniques and mechanisms for a central management plane to automatically create and assign system identifiers to network devices, thereby creating a global network hierarchy within a network. The techniques enable the use of a system identifier to be automatically generated and assigned, as well as configuration and network policies to be automatically generated based on the system identifier. Accordingly, the techniques enable automation of regional connectivity and policy application, a simplified manner of troubleshooting/debugging of any connectivity issues, and a simplified, aggregated view of statistic and analytics related to problems at site, sub-region, and region levels.

20 Claims, 6 Drawing Sheets

(56) References Cited

U.S. PATENT DOCUMENTS

| | | | |
|---|---|---|---|
| 9,900,284 B2* | 2/2018 | Friedman | H04L 43/50 |
| 10,999,169 B1 | 5/2021 | Qian et al. | |
| 11,477,076 B2* | 10/2022 | Cohn | H04L 67/10 |
| 2008/0104276 A1 | 5/2008 | Lahoti | |
| 2019/0104111 A1 | 4/2019 | Cidon et al. | |
| 2020/0153697 A1* | 5/2020 | Turner | H04L 63/0823 |
| 2020/0336336 A1 | 10/2020 | Sethi et al. | |
| 2021/0036987 A1 | 2/2021 | Mishra et al. | |
| 2021/0227035 A1* | 7/2021 | Vinograd | G06F 9/5072 |
| 2021/0367834 A1 | 11/2021 | Palavalli et al. | |
| 2022/0103471 A1* | 3/2022 | Kulkarni | H04L 41/122 |
| 2022/0217052 A1 | 7/2022 | Mutnuru | |

OTHER PUBLICATIONS

PCT Search Report and Written Opinion dated Nov. 30, 2023 for PCT Application No. PCT/ US2023/030863 from PCT Summary, 32 pages.

\* cited by examiner

200A

CENTRAL MANAGEMENT PLANE 202

| SEARCH 204 | DETAILS    POOLS    DEVICES |
|---|---|
| ⌄ GLOBAL 206 | ✚ ADD NODE ← 212 |
| ⌄ AMERICAS 208A | |
| ⌄ USA 210A | NAME            GLOBAL |
| ⌄ CALIFORNIA | |
| - LOS-ANGELES | DESCRIPTION    GLOBAL NODE FOR NETWORK HIERARCHY IN CENTRAL MANAGEMENT PLANE |
| - SAN-JOSE | |
| ⌄ ASIA 208B | TYPE            GLOBAL |
| ⌄ INDIA 210B | |
| ⌄ KARNATAKA | |
| - MYSORE | |
| - MANGALORE | |
| - BANGALORE | |

FIG. 2A

NETWORK HIERARCHY CONSTRUCTS ENABLING INSTANT GLOBAL WIDE AREA NETWORK CONNECTIVITY

CROSS REFERENCE TO RELATED APPLICATIONS

This application claims priority to U.S. Provisional Patent Application No. 63/400,119, filed Aug. 23, 2022, the entire contents of which are incorporated herein by reference.

TECHNICAL FIELD

The present disclosure relates generally to the field of computer networking, and more particularly to enabling automated WAN connectivity via a global network hierarchy.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Threat and compliance data provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to commmnunicatex with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Current network architecture in SDWAN is a flat site-to-site connectivity model. Changing the topology to meet customer network designs involves complex control policies to meet an organization's requirements. In some cases, SDWAN overlays may use a system identifier (e.g., such as a system IP address) as a unique identifier for every device that participates in the overlay.

Network administrators need to manually assign these system identifiers to each network device when the network device is onboarded. Network administrators may also build policies and regional and/or global network connectivity configurations based on these system identifiers. Moreover, network debuggability and analytics are also based on the network identifier. However, network administrators are required to put in a lot of manual effort on part in order to manage the system identifiers, the connectivity and policy configuration, as well as the debuggability. This not only takes a great deal of time, but also results in lack of efficiency and resource use within the network.

Accordingly, there is a need for a simplified and automated way to create, assign, and manage system identifiers within a network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A and 2B illustrate example user interfaces associated with the system described in FIG. 1.

DESCRIPTION OF EXAMPLE EMBODIMENTS

Overview

Figure 1:
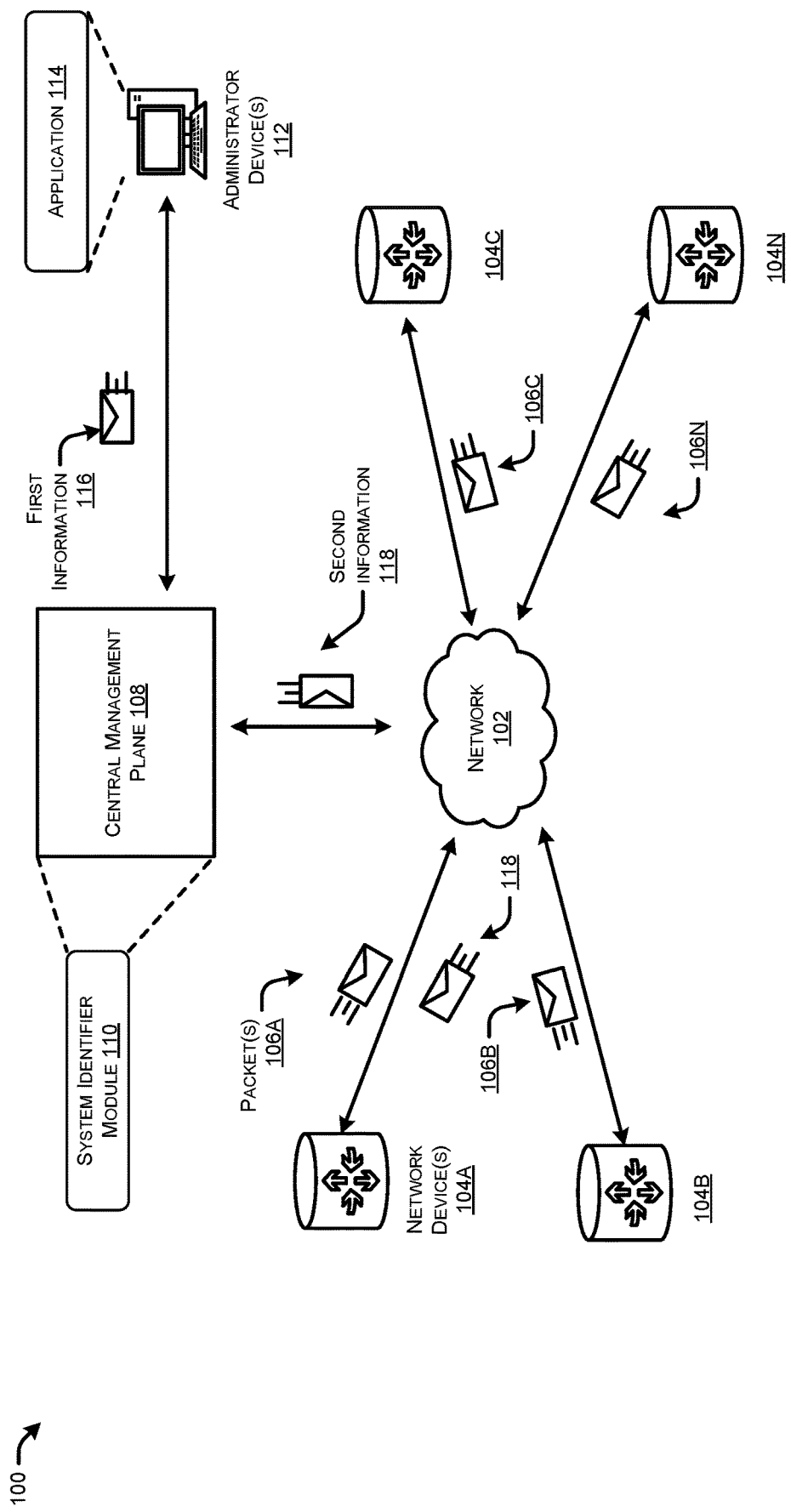
FIG. 1 illustrates a system-architecture diagram of an environment in which a system can create a global network hierarchy using system identifiers.

The present disclosure relates generally to the field of computer networking, and more particularly to creating a global network hierarchy using system identifiers.

A method to perform the techniques described herein may be implemented by a central management plane of a network and may include receiving, via the network, information associated with onboarding a network device. Additionally, the method may include accessing, geographic information associated with the network device. The method may also include determining, based at least in part on the geographic information, a role of the network device within the network. Further, the method may include assigning, based at least in part on the role and the geographic information, a system identifier (ID) to the network device.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Current network architecture in SDWAN is a flat site-to-site connectivity model. Changing the topology to meet customer network designs involves complex control policies to meet an organization's requirements. In some cases, SDWAN overlays may use a system identifier (e.g., such as a system IP address) as a unique identifier for every device that participates in the overlay.

Network administrators need to manually assign these system identifiers to each network device when the network device is onboarded. Network administrators may also build policies and regional and/or global network connectivity configurations based on these system identifiers. Moreover, network debuggability and analytics are also based on the network identifier. However, network administrators are required to put in a lot of manual effort on part in order to manage the system identifiers, the connectivity and policy configuration, as well as the debuggability. This not only takes a great deal of time, but also results in lack of efficiency and resource use within the network.

Accordingly, there is a need for a simplified and automated way to create, assign, and manage system identifiers within a network.

This disclosure describes techniques and mechanisms for a central management plane to automatically create and assign system identifiers to network devices, thereby creating a global network hierarchy within a network. In some examples, the system may receive, via a network, information associated with onboarding a network device. The system may access geographic information associated with the network device. The system may determine, based at least in part on the geographic information, a role of the network device within the network and assign, based at least in pail on the role and the geographic information, a system identifier (ID) to the network device.

In some examples, the system may comprise a system identifier module. In some examples, the system identifier module may be configured to generate a system identifier for a network device. The system identifier may correspond to a unique identifier of the device and may comprise one or more numbers, symbols, alphanumeric letters, etc.). In some examples, the system identifier indicates the global network hierarchy of the network device. For instance, the system identifier may comprise one or more octets. In some examples, the system identifier module may utilize an algorithm to generate the system identifier. For instance, the system identifier module may assign a first value to a first octet of the system identifier, where the first value indicates a continent and/or country associated with the network device. The system identifier module may assign a second value to a second octet of the system identifier, where the second value indicates a state associated with the network device. The system identifier module may assign a third value to a third octet of the system identifier, where the third value indicates a city sub-region and/or a city region associated with the network device. The system identifier module may assign a fourth value to a fourth octet of the system identifier, where the fourth value indicates a role (e.g., border router, sub-region border router, edge device, etc.) associated with the network device. In some examples, the system identifier is generated based at least in part on geographic information associated with the network device.

In this way, the system can create a global network hierarchy to implement auto-generation of system identifiers for network devices and auto-configuration of policies for network devices at on-boarding, thereby simplifying and streamlining the onboarding process. Further, the techniques described herein utilizes geographic information that greatly simplifies automation and management of configuration for network administrators. Moreover, the global network hierarchy enables network administrators to easily identify the geographical source of a problematic connection purely by looking at the system identifier alone, thereby reducing the time to fix issues within the network. Similarly, statistics aggregation and reverse mapping of data records to network sites is greatly simplified. For instance, by using the global network hierarchy, a network administrator can view combined alarms, issues, traps etc. at a site, sub-region, region level just by looking at system identifier of the record.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can create a global network hierarchy using system identifiers. While the system 100 shows an example central management plane 108, it is understood that any of the components of the system may be implemented on any device in the network 102.

In some examples, the system 100 may include a network 102 that includes network devices 104. The network 102 may include one or more networks implemented by any viable communication technology, such as wired and/or wireless modalities and/or technologies. The network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise a central management plane 108. In some examples, the central management plane 108 corresponds to a system that has complete visibility into the security fabric of a given network (e.g., enterprise network, smaller network, etc. In some examples, the central management plane 108 may comprise a controller, one or more processors, etc. In some examples, the central management plane 108 may be integrated as part of Cisco's vManage feature and/or included in a SD-WAN architecture.

The central management plane 108 may be configured to communicate with one or more network device(s) 104. For instance, as noted above the central management plane 108 may receive network data (e.g., network traffic load data, network client data, etc.) or other data (e.g., application load data, data associated with WLCs, APs, etc.) from the network device(s) 104. The network device(s) 104 may comprise routers, switches, access points, stations, radios, or any other network device. In some examples, the network device(s) 104 may monitor traffic flow(s) within the network and may report information associated with the traffic flow(s) to the central management plane 108.

In some examples, network device(s) 104 and/or central management plane 108 may communicate information. For instance, the network device(s) 104 may send data packet(s) 106 to other network device(s). The central management plane 108 may be configured to monitor the packets 106. In some examples, the packets may comprise data (e.g., which application is used, by which station, traffic characteristics and duration, etc.) associated with network traffic and may store the data as part of the system and/or central management plane 108 (e.g., such as in a database and/or memory associated with the central management plane 108).

In some examples, the network device(s) 104 and/or administrator device(s) 112 may send first information 116 to the central management plane 108. For instance, the first information 116 may comprise onboarding information (e.g., device identifier(s), client, etc.) associated with a network device. In some examples, the first information 116 may further comprise geographic information (e.g., sensor data and/or location data) associated with the network device 104. In some examples, the administrator device 112 sends the first information 116 to the central management plane and the network device 104 sends the geographic information to the central management plane 108. The central management plane 108 may be configured to send second information 118 to the network device(s) 104 and/or administrator device(s) 112. In some examples, the second information 118 may comprise a system identifier, configuration information, and/or policy information.

In some examples, the central management plane 108 may be configured to monitor and collect traffic data and/or operational data from the network device(s) 104. For instance, where a network administrator is managing a site in Bangalore, the central management plane may utilize file-based statistics and real-time operational data from one or more network device(s) 104 at the Bangalore site. In this example, the data records that are collected and stored by the central management plane 108 from that site will have system identifiers as one of the key fields and/or identifiers which will help the central management plane 108 understand the source of the data record. As an example, the data record may comprise (System-EP, Device-Serial, <Statistics data> . . . ). In this example, just by looking at the system identifier alone, (e.g., such as 91.80.2) the central management plane 108 may determine that it needs to aggregate this data record into the Bangalore region as well as into Karnataka and Asia/India. Accordingly, all the alarms in the central management plane 108 can now be shown on a global map pretty easily. This enables the application 114 to provide a simplified user interface and the ability for network administrators to zoom in or out on the monitoring layer to visualize and troubleshoot problem(s) with one or more site(s) within the network.

In some examples, the central management plane 108 may be configured to communicate with administrator device(s) 112. As illustrated, the administrator device(s) 112 may comprise an application 114. In some examples, the application 114 may correspond to an application provided by a service provider (e.g., such as Cisco) that enables an administrator of the network 102 to access the central management plane 108. For instance, the application 114 may correspond to Cisco's vManage service.

In some examples, the central management plane 108 may comprise a system identifier module 110. In some examples, the system identifier module 110 may be configured to generate a system identifier for a network device. The system identifier may correspond to a unique identifier of the device and may comprise one or more numbers, symbols, alphanumeric letters, etc.). In some examples, the system identifier indicates the global network hierarchy of the network device 104. For instance, the system identifier may comprise one or more octets. In some examples, the system identifier module 110 may utilize an algorithm to generate the system identifier. For instance, the system identifier module 110 may assign a first value to a first octet of the system identifier, where the first value indicates a continent and/or country associated with the network device. The system identifier module 110 may assign a second value to a second octet of the system identifier, where the second value indicates a state associated with the network device. The system identifier module 110 may assign a third value to a third octet of the system identifier, where the third value indicates a city sub-region and/or a city region associated with the network device. The system identifier module 110 may assign a fourth value to a fourth octet of the system identifier, where the fourth value indicates a role (e.g., border router, sub-region border router, edge device, etc.) associated with the network device.

In some examples, the system identifier module 110 may generate the system identifier using one or more pre-trained models and/or pre-trained weighted models. In some examples, the artificial intelligence models are pre-trained using machine learning techniques. In some examples, the system identifier module 110 may store machine-trained data models for use during operation Machine learning techniques include, but are not limited to supervised learning algorithms (e.g., artificial neural networks, Bayesian statistics, support vector machines, decision trees, classifiers, k-nearest neighbor, etc.), regression models, unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs.

At "1", the system may receive information associated with a network device. For instance, the system may correspond to the central management plane 108 described above. In some examples, the information may comprise onboarding information and/or geographic information. In some examples, the information may comprise network information (e.g., connection information, etc.).

At "2", the system may determine geographic information. For instance, the system may determine the geographic information based at least in part on the information received from the network device.

At "3", the system may determine a role of the network device within the network. For instance, the system may determine the role of the network device based at least in part on the geographic information. In some examples, the role of the network device may comprise a border router, a sub-region border router, an edge device, etc.

At "4", the system may generate and assign a system identifier to the network device. For instance, the system may generate and assign the system identifier using the system identifier module 110 described above. In some examples, the system may send and/or or push policy information and/or configuration information that is automatically generated based on the system identifier to the network device.

In this way, the system can utilize a global network hierarchy to implement auto-generation of system identifiers for network devices and auto-configuration of policies for network devices at on-boarding, thereby simplifying and streamlining the onboarding process. Further, the techniques described herein utilizes geographic information that greatly simplifies automation and management of configuration for network administrators. Moreover, the global network hierarchy enables network administrators to easily identify the geographical source of a problematic connection purely by looking at the system identifier alone, thereby reducing the time to fix issues within the network. Similarly, statistics aggregation and reverse mapping of data records to network sites is greatly simplified. For instance, by using the global network hierarchy, a network administrator can view combined alarms, issues, traps etc. at a site, sub-region, region level just by looking at system identifier of the record.

Figure 2B:
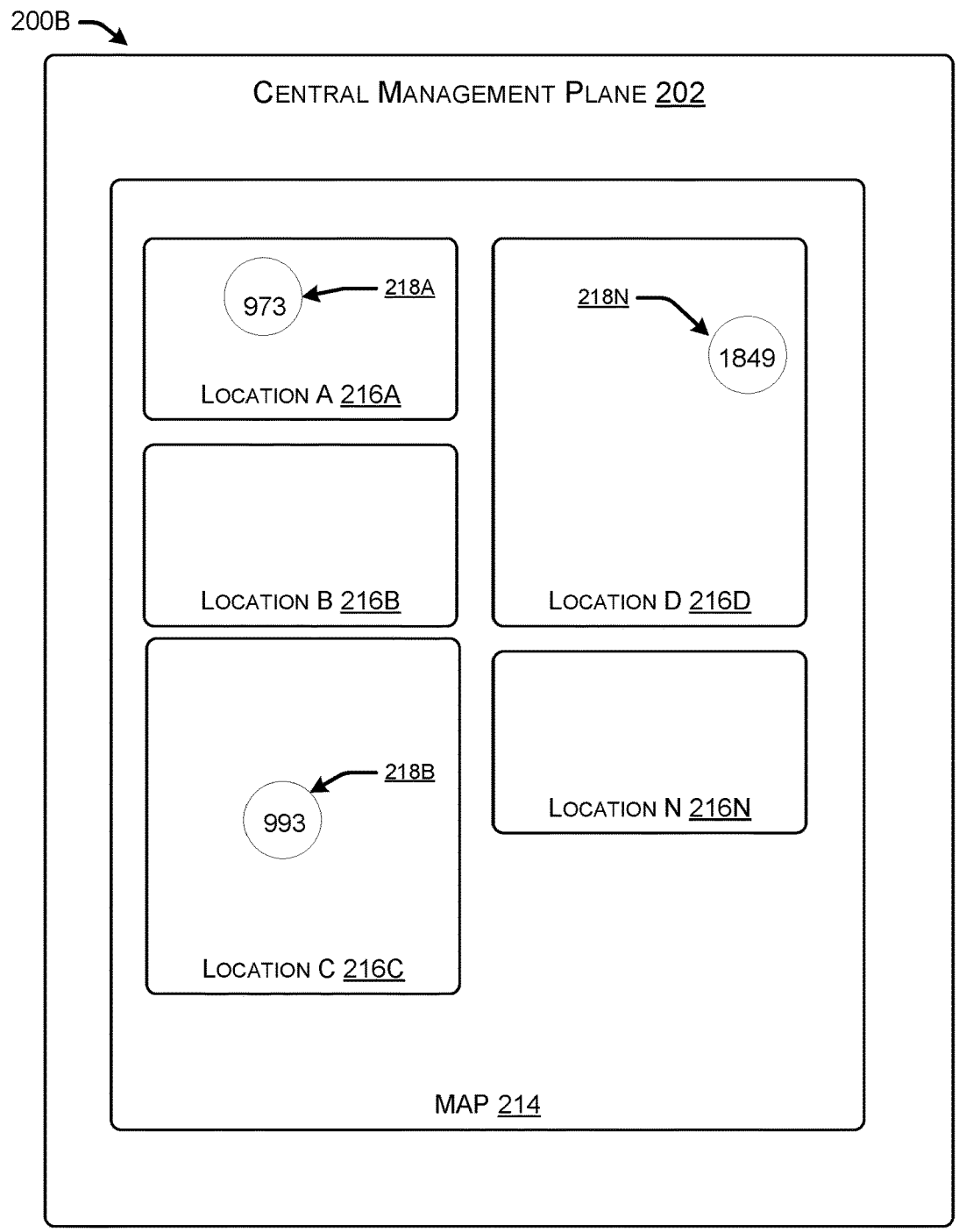

FIGS. 2A and 2B illustrate a component diagram of an example central management plane described in FIG. 1. In some examples, the user interface 200A and/or 200B may be presented on an administrator device 112 via application 114. In some examples, the user interface may correspond to a dashboard for a service (e.g., such as Cisco's vManage).

As illustrated in FIG. 2A, the user interface 200A may correspond to a central management plane 202. In some examples, the central management plane 202 is presented via the application 114 when the user accesses services provided by a service provider (e.g., Cisco's vManage, the central management plane 108 described above, etc.).

The user interface 200A may comprise a search bar 204, which enables a user (e.g., a network administrator) to search one or more site(s) managed within the network. The user interface 200A may further comprise one or more selectable elements (e.g., 206, 208, 210, etc.). In some examples, the selectable element(s) 206, 208, 210, etc. correspond to a network hierarchy within the network managed by the user. The first selectable drop down 206 may indicate a location associated with the network managed by the user. In this example, the user manages a network that spans the globe. The second selectable element(s) 208 and third selectable element(s) 210 may correspond to continent(s) and/or countries associated with one or more site(s) within the network. As illustrated, the user may manage sites located within the USA and India. For instance, by selecting the third selectable element(s) 210, the user interface 200A may display one or more additional selectable elements associated with cities, states, etc. The additional selectable elements may represent location(s) within the third selectable element(s) 210 that comprise site(s) of network device(s) within the network.

As illustrated in FIG. 2A, the user interface 200A may further comprise an add node selectable element 212. The add node selectable element 212 may be selected by a user in order to onboard a new network device to the network. For instance, the user may provide input associated with the network device to the central management plane 202 via the user interface 200A. In some examples, the input may comprise the first information 116 described above.

As illustrated in FIG. 2B, the user interface 200B may correspond to another user interface 200B provided by the central management plane 202. The other user interface 200B may comprise a map 214. In some examples, the map 214 may comprise a map of one or more location(s) 216 (e.g., cities, state(s), province(s), countries, and/or continent(s)). In some examples, the location(s) 216 may correspond to one or more site(s) associated with a network. For instance, where a network administrator manages a network that spans the United States, the map 214 may comprise a map of the United States, and the one or more location(s) 216 may correspond to the 50 states and/or one or more state(s). In some examples, where the network administrator manages a network that spans the globe, the map 214 may comprise a world map and the one or more location(s) 216 may comprise one or more continent(s) and/or countries.

As illustrated in FIG. 2B, the map 214 may comprise one or more indication(s) 218. IN some examples, the indication(s) 218 correspond to one or more site(s) associated with a network managed by a network administrator. For example, a first indication 218A may comprise a number of network device(s) (illustrated as "973") located at a geographic location within Location A 216A. For instance, the first indication 218A may show that 973 network device(s) are located at a first site within the network, the second indication 218B may show that 993 network device(s) are located at a second site within the network, etc. In some examples, In some examples, a network administrator may zoom in or out on the one or more indication(s) 218. For instance, the network administrator may zoom in on the first indication 218A, which may zoom in on Location A 216A within the map 214. In this example, the map 214 may display additional information associated with the site corresponding to the first indication 218A. In some examples, the one or more indication(s) 218 are selectable by the network administrator. In this example, by selecting an indication, the map 214 may display additional information associated with the site(s) within the network.

For example, where a network administrator is managing a site in Bangalore (e.g., such as location A 216A), the central management plane may collect and store data records from that site. As described above, each of the data records may comprise system identifiers as one of the key fields and/or identifiers which will help the central management plane 108 understand the source of the data record. For instance, the data record may comprise (System-IP, Device-Serial, <Statistics data> . . . ). Accordingly, all the alarms in the central management plane 108 can now be shown on a global map pretty easily. This enables the application 114 to provide a simplified user interface and the ability for network administrators to zoom in or out on the monitoring layer to visualize and troubleshoot problem(s) with one or more site(s) within the network.

Figure 3:
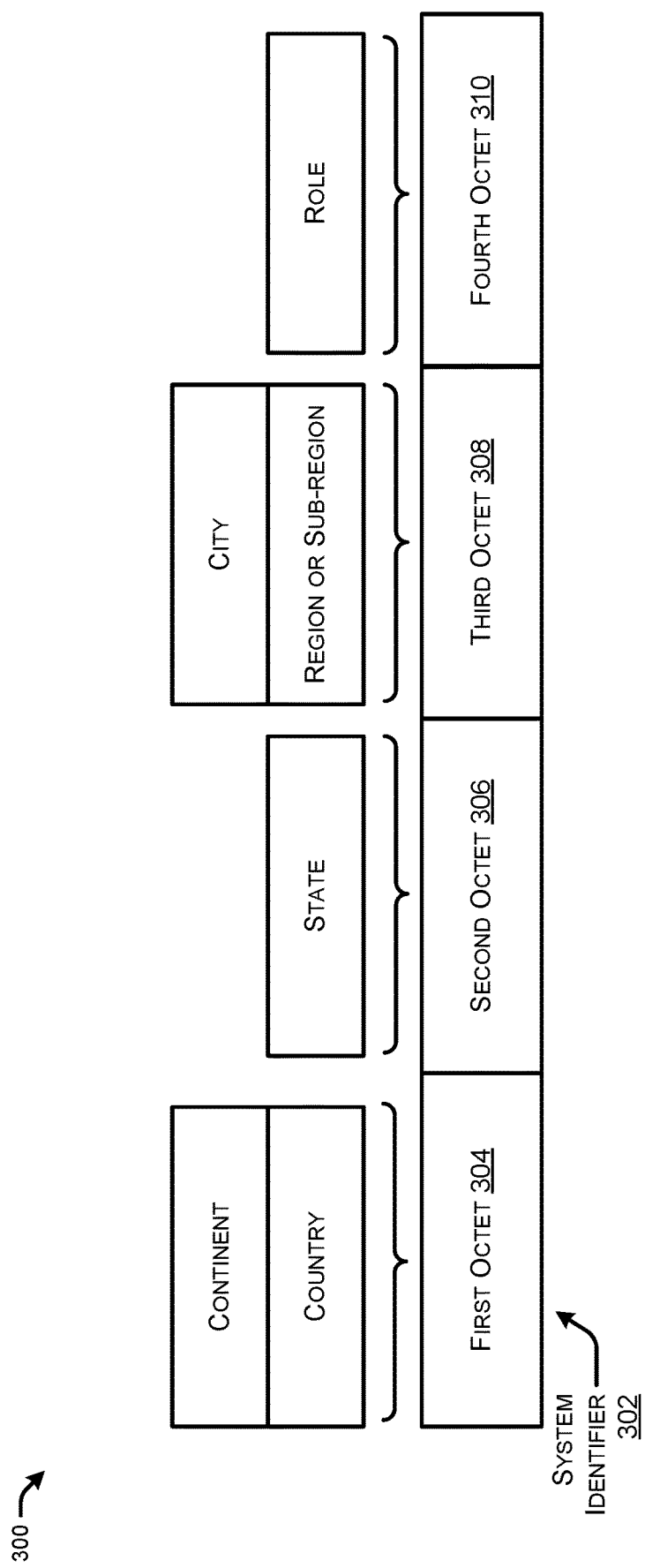
FIG. 3 illustrates an example environment including a system identifier that is generated by the system described in FIGS. 1-2.

FIG. 3 illustrates an example environment including a system identifier that is generated by the system described in FIGS. 1-2. In some examples, the system identifier 302 may be generated by the system identifier module 110 of the central management plane 108 described above. The system identifier may correspond to a unique identifier of the device and may comprise one or more numbers, symbols, alphanumeric letters, etc.). In some examples, the system identifier indicates the global network hierarchy of the network device. For instance, the system identifier may comprise one or more octets. As described above, the system identifier module may utilize an algorithm to generate the system identifier 302.

As illustrated, the system identifier 302 may include a first octet 304, a second octet 306, a third octet 308, and a fourth octet 310. For instance, the first octet 304 may comprise a first value, where the first value indicates a continent and/or country associated with the network device. The second octet 306 may comprise a second value, where the second value indicates a state associated with the network device. The third octet 308 may comprise a third value, where the third value indicates a city sub-region and/or a city region associated with the network device. The fourth octet may comprise a fourth value, where the fourth value indicates a role (e.g., border router, sub-region border router, edge device, etc.) associated with the network device. In some examples, the system identifier is generated based at least in part on geographic information associated with the network device. In some examples, the system identifier is generated automatically. In other examples, a network administrator may override the auto-generation of the system identifier.

In some examples, the system identifier 302 may comprise a system IP address. For instance, in a first example, the system identifier 302 may comprise 91.80.3.10. In this example, "91" may be assigned to India, "80" may be assigned to a state within India, "3" may represent a particular city region and/or sub-region within the state, and "10" may indicate a particular role of the network device.

In some examples, the third octet 308 may comprise a value that indicates whether the location of the network device is a city or a sub-region. For instance, where the value of the third octet 308 is greater than "0", the network device may be located at a border sub-region of the city within the network. In some examples, the value of the fourth octet 310 may comprise a number within a particular range, where the range indicates the role of the device. For example, if the value is between [1-10], the role of the device may comprise a region border router. Where the value is between [11-253], the role of the device may comprise an edge device. For instance, where the system identifier 302 comprises 91.80.3.10, the role of the network device may be a border sub-region device, as indicated by "3" in the third octet 308 and "10" in the fourth octet 310.

In some examples, the third octet 308 may comprise a value that indicates whether the location of the network device is a city or a sub-region. For instance, where the value of the third octet 308 is "0", the network device may be located at a border region of the network. In this example, the system identifier 302 may comprise 91.80.0.5. As noted above, the value of the fourth octet 310 may comprise a number within a particular range, where the range indicates the role of the device. For example, if the value is between [1-10], the role of the device may comprise a region border router. Where the value is between [11-253], the role of the device may comprise an edge device. For instance, where the system identifier 302 comprises 91.80.0.5, the role of the network device may be a border region device, as indicated by "0" in the third octet 308 and "5" in the fourth octet 310. In another example, the system identifier 302 may comprise 91.80.0.11. In this example, the role of the network device may be a border edge device, as indicated by "0" in the third octet 308 and "11" in the fourth octet 310.

In some examples, the values assigned to a particular octet and/or the range(s) associated with each octet may be customized based on the network being managed. For instance, the value(s) assigned to a range indicating that the role of the network device is an edge device may be [11-253] for a first client and [15-360] for another client. Accordingly, each client may have a particular, customized value range for each octet.

In this way, the system can create a global network hierarchy to implement auto-generation of system identifiers for network devices and auto-configuration of policies for network devices at on-boarding, thereby simplifying and streamlining the onboarding process. Further, the techniques described herein utilizes geographic information that greatly simplifies automation and management of configuration for network administrators.

In some examples, with the use of the automatic and hierarchical addressing scheme described above, it is also possible to automate the specification of Markov network (e.g., MRF) regions in an intent based fashion at any level of granularity that is desired. For example, it is possible to create a node-health-monitor (NHM) node with a MRF region/sub-region attribute and specify just the values for the first 2 octets (e.g., first octet 304 and second octet 306), to indicate that all devices that share those 2 octets will be part of that MRF region. Accordingly, this may simplify and automate the organization of devices in the overlay into MRF regions. Further, once the network devices are assigned to particular MRF regions, MRF functionality may automatically take care of all the routing aspects to ensure hierarchical traffic flow, optimized tunnel setup etc. Similarly, MRF sub-regions nodes may also be created in the NHM hierarchy with an automatic-rule, based on a mapping of the first n-bits of the auto-generated octets 304, 306, 308, 310 of the system identifier. In this way, network devices may be automatically grouped into MRF sub-regions without any additional effort on the part of the user.

Figure 4:
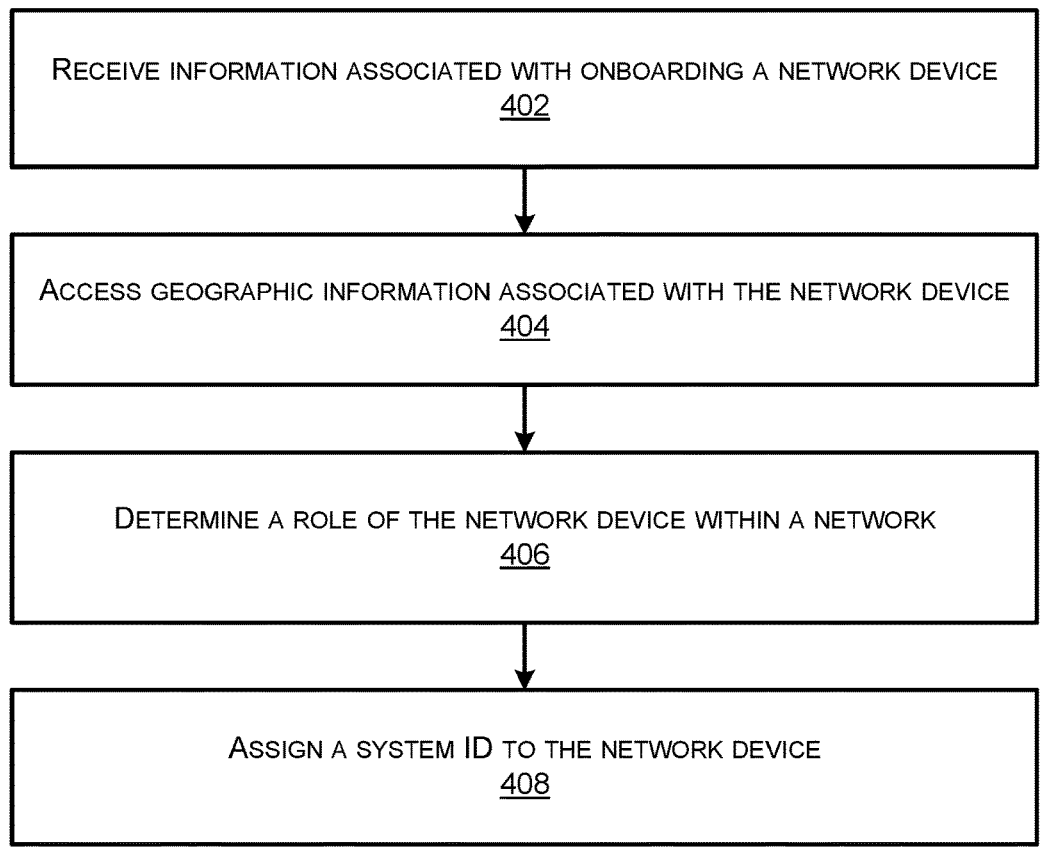
FIG. 4 illustrates a flow diagram of an example method for auto-generation of system identifiers associated with a global network hierarchy associated with the system described in FIGS. 1-3.

FIG. 4 illustrates a flow diagram of an example system 400 for auto-generation of system identifiers associated with a global network hierarchy. In some instances, the steps of system 400 may be performed by one or more devices (e.g., central management plane 108, network device(s) 104, etc.) that include one or more processors and one or more non-transitory computer-readable media storing computer-executable instructions that, when executed by the one or more processors, cause the one or more processors to perform operations of system 400.

At 402, the system may receive information associated with onboarding a network device to a network. In some examples, the information comprises geographic information At 404, the system may access geographic information associated with the network device. In some examples, the geographic information is accessed based at least in part on the information received from the network device.

At 406, the system may determine a role of the network device within the network. As described above, the role may be determined based at least in part on the geographic information. In some examples, the role may comprise a border router, a sub-region border router, an edge device, etc.

At 408, the system may assign a system identifier to the network device. In some examples, the system identifier corresponds to a global network hierarchy of the network. In some examples, assigning the system identifier further comprises generating, based at least in part on the geographic information and the role, using an algorithm, the system identifier. For instance, the system may generate the system identifier using the system identifier module 110 described above. In some examples, assigning the system identifier further comprises sending the system identifier to the network device via the network. In some examples, the system identifier comprises indications of a continent, a country, a state, a city, and the role associated with the network device.

In some examples, the system may generate, based at least in part on the system identifier, one or more policies associated with the network device and/or one or more configurations associated with the network device. The system may send, via the network, the one or more policies and/or one or more configurations to the network device.

In some examples, the system may receive, via the network, second information associated with onboarding a second network device. The system may access second geographic information associated with the second network device, determine, based at least in part on the second geographic information, a second role of the second network device within the network, and assign, based at least in part on the second role and the second geographic information, a second system identifier (ID) to the second network device. In some examples, the second role of the second network device may be different from the role of the network device. In some examples, the network device and the second network device may be located at different sites within the network.

Figure 5:
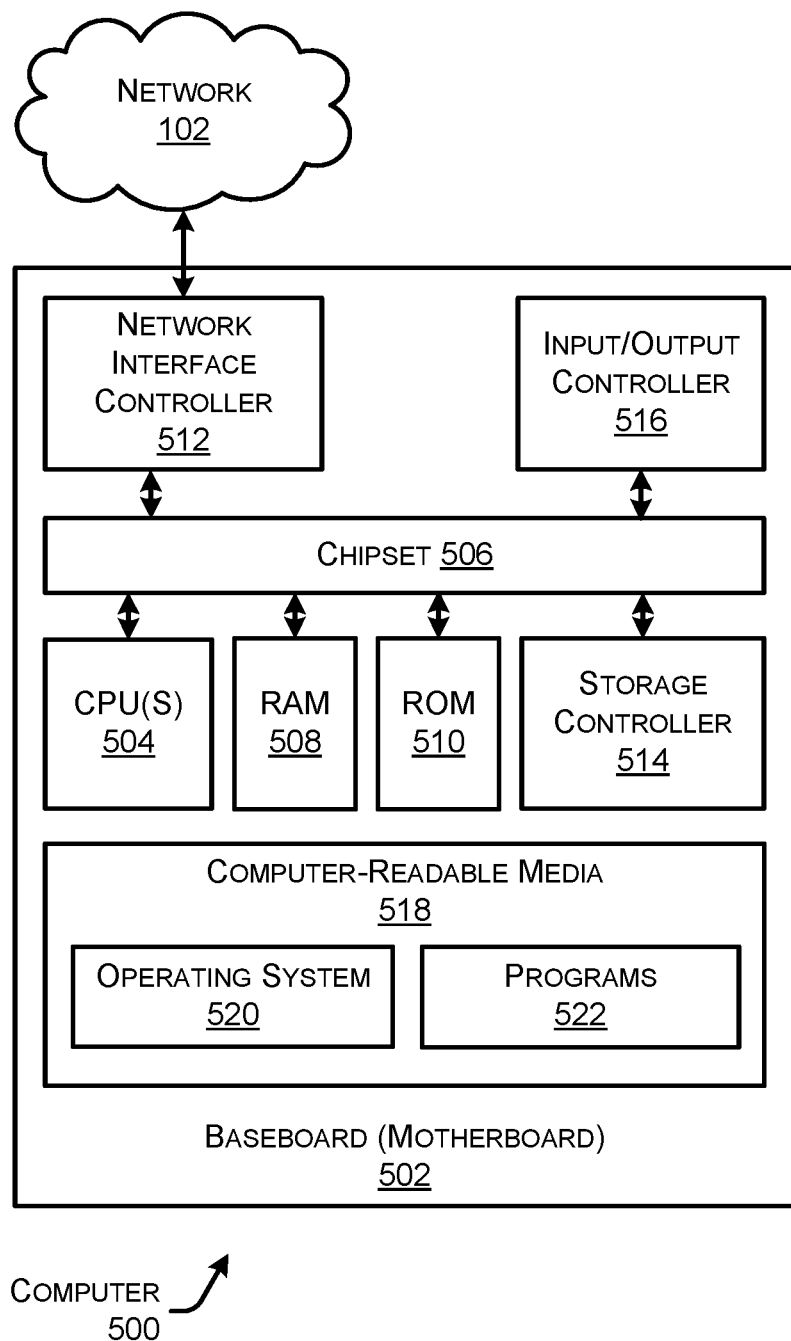
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a central management plane 108 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATAA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the central management plane 108 and/or any components included therein, may be supported by one or more devices similar to computer 500. Stated otherwise, some or all of the operations performed by the central management plane 108 and/or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLT-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. or might utilize an architecture completely different than that shown in FIG. 5.

As described herein, the computer 500 may comprise one or more of a central management plane 108 and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the central management plane 108 and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet Wi-Fi™, and so forth.

The programs 522 may comprise any type of programs or processes to perform the techniques described in this disclosure. For instance, the programs 522 may cause the computer 500 to perform techniques including: implemented by a central management plane of a network, the method comprising: receiving, via the network, information associated with onboarding a network device; accessing, geographic information associated with the network device; determining, based at least in part on the geographic information, a role of the network device within the network; and assigning, based at least in part on the role and the geographic information, a system identifier (ID) to the network device.

In this way, the computer 500 can utilize a global network hierarchy to implement auto-generation of system identifiers for network devices and auto-configuration of policies for network devices at on-boarding, thereby simplifying and streamlining the onboarding process. Further, the techniques described herein utilizes geographic information that greatly simplifies automation and management of configuration for network administrators. Moreover, the global network hierarchy enables network administrators to easily identify the geographical source of a problematic connection purely by looking at the system identifier alone, thereby reducing the time to fix issues within the network. Similarly, statistics aggregation and reverse mapping of data records to network sites is greatly simplified. For instance, by using the global network hierarchy, a network administrator can view combined alarms, issues, traps etc. at a site, sub-region, region level just by looking at system identifier of the record.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a central management plane of a network, the method comprising:
    receiving, via the network, information associated with onboarding a network device;
    accessing, geographic location information indicating a geographic location at which the network device is located during the onboarding;
    configuring, based at least in part on received information containing a role of the network device and the geographic location information, an Internet Protocol (IP) address that comprises at least one or more first numbers and one or more second numbers, wherein the one or more first numbers indicate at least the geographic location of the network device and the one or more second numbers indicate at least the role of the network device; and
    assigning the IP address to the network device such that the IP address is usable to determine based on the one or more first numbers and the one or more second numbers at least the geographic location of the network device and the role of the network device.

2. The method of claim 1, wherein the IP address is used as a system ID that corresponds to a global network hierarchy of the network.

3. The method of claim 1, wherein the information comprises the geographic information.

4. The method of claim 1, wherein assigning the IP address further comprises:
    generating, based at least in part on the geographic information, using an algorithm, the IP address; and
    using the IP address as a system ID associated with the network device via the network.

5. The method of claim 1, wherein the IP address comprises indications of a continent, a country, a state, and a city associated with the network device.

6. The method of claim 4, further comprising:
    generating, based at least in part on the system ID, one or more policies associated with the network device; and
    sending, via the network, the one or more policies to the network device.

7. The method of claim 1, further comprising:
    receiving, via the network, second information associated with onboarding a second network device;
    accessing, second geographic location information indicating a geographic location at which the second network device is located during the onboarding;
    generating, based at least in part on the second geographic information, another IP address that indicates at least the geographic location of the second network device; and
    assigning the another IP address to the second network device such that the another IP address is usable to determine at least the geographic location of the second network device.

8. The method of claim 1, wherein the network comprises a Software-Defined Wide Area Network (SD-WAN) architecture.

9. A system comprising:
    one or more processors; and
    one or more non-transitory computer-readable media storing computer-executable instructions that, when executed by the one or more processors, cause the one or more processors to perform operations comprising:
        receiving, via a network, information associated with onboarding a network device;
        accessing, geographic location information indicating a geographic location at which the network device is located during the onboarding;
        configuring, based at least in part on received information containing a role of the network device and the geographic location information, an Internet Protocol (IP) address that comprises at least one or more first numbers and one or more second numbers, wherein the one or more first numbers indicate at least the geographic location of the network device and the one or more second numbers indicate at least the role of the network device; and
        assigning the IP address to the network device such that the IP address is usable to determine based on the one or more first numbers and the one or more second numbers at least the geographic location of the network device and the role of the network device.

10. The system of claim 9, wherein the IP address is used as a system ID that corresponds with a global network hierarchy of the network.

11. The system of claim 9, wherein the information comprises the geographic information.

12. The system of claim 9, wherein assigning the IP address further comprises:
    generating, based at least in part on the geographic information, using an algorithm, the IP address; and
    using the IP address as a system ID to the network device via the network.

13. The system of claim 9, wherein the IP address comprises indications of a continent, a country, a state, and a city associated with the network device.

14. The system of claim 12, the operations further comprising:
    generating, based at least in part on the system ID, one or more policies associated with the network device; and
    sending, via the network, the one or more policies to the network device.

15. The system of claim 9, the operations further comprising:
    receiving, via the network, second information associated with onboarding a second network device;
    accessing, second geographic location information indicating a geographic location at which the second network device is located during the onboarding;
    generating, based at least in part on the second geographic information, another IP address that indicates at least the geographic location of the second network device; and
    assigning the another IP address to the second network device such that the another IP address is usable to determine at least the geographic location of the second network device.

16. The system of claim 9, wherein the network comprises a Software-Defined Wide Area Network (SD-WAN) architecture.

17. One or more non-transitory computer-readable media storing computer-readable instructions that, when executed by one or more processors, cause the one or more processors to perform operations comprising:
    receiving, via a network, information associated with onboarding a network device;
    accessing, geographic location information indicating a geographic location at which the network device is located during the onboarding;

configuring, based at least in part on received information containing a role of the network device and the geographic location information, Internet Protocol (IP) address that comprises at least one or more first numbers and one or more second numbers, wherein the one or more first numbers indicate the geographic location of the network device and the one or more second numbers indicate at least the role of the network device; and assigning the IP address to the network device such that the IP address is usable to determine based on the one or more first numbers and the one or more second numbers at least the geographic location of the network device and the role of the network device.

18. The one or more non-transitory computer-readable media of claim 17, wherein the IP address comprises indications of a continent, a country, a state, and a city associated with the network device.

19. The method of claim 8, wherein the SD-WAN architecture comprises SD-WAN overlays that use the IP address as a unique identifier for each network device that participates in the SD-WAN overlays.

20. The system of claim 16, wherein the SD-WAN architecture comprises SD-WAN overlays that use the IP address as a unique identifier for each network device that participates in the SD-WAN overlays.

* * * * *